Patented July 26, 1932

1,868,851

UNITED STATES PATENT OFFICE

GEORGE ROCKER, OF WESTFIELD, AND EDMUND B. MIDDLETON, OF NEW BRUNSWICK, NEW JERSEY, ASSIGNORS TO DU PONT VISCOLOID COMPANY, INC., OF WILMINGTON, DELAWARE, A CORPORATION OF DELAWARE

CELLULOSE ESTER COMPOSITION

No Drawing.   Application filed October 8, 1931.   Serial No. 567,760.

This application is a continuation in part of our co-pending application S. N. 138,565 filed September 29, 1926.

This invention relates to cellulose ester compositions suitable for use in the plastic and analogous arts, such as sheet or film manufacture and the production of coating compositions.

One object of our invention is to produce a composition which is highly elastic in its finished and dry state. Another object is to produce a composition which may be made into strong and highly elastic sheets or films capable of retaining elongation and of remaining free from brittleness for a great length of time. It is a further object to produce a composition capable of easy manipulation in the plastic, film and coating composition arts. Another object of the invention is to provide a composition containing a volatile solvent in which the rate of volatilization of the solvent is reduced and "blushing" is prevented in the finished film or coating.

These and other objects are attained by providing a cellulose ester composition containing a softener comprising an ether of glycerol, particularly the methyl ether of glycerol.

Illustrative of a specific embodiment of our invention the following examples are given as representing highly satisfactory film dope compositions (proportions being given in parts by weight):

Example 1

10 parts nitrocellulose
1 part camphor
1 part mono-methyl ether of glycerol
15 parts methyl alcohol
40 parts acetone

Example 2

5 parts cellulose acetate
1 part mono-methyl ether of glycerol
20 parts acetone or the dimenthyl- or trimethyl ether of glycerol may be employed in place of the mono-methyl ether, these having been found to have satisfactory solvent properties with regard to cellulose acetate.

Example 3

10 parts nitrocellulose
½ part methyl ether of glycerol
1 part camphor
15 parts methyl alcohol
25 parts acetone
10 parts ethyl acetate
5 parts butyl acetate The following examples are typical of compositions suitable for use in the manufacture of plastics such as pyralin and the like:

Example 4

15 parts camphor
10 parts mono-methyl ether of glycerol
1 part urea
1 part zinc acetate
73 parts nitrocellulose

Example 5

15 parts camphor
10 parts mono-methyl ether of glycerol
1 part urea
1 part zinc acetate
50 parts gypsum
50 parts titanium oxide
73 parts nitrocellulose The following examples are illustrative of compositions suitable for use as lacquers and enamels:

Example 6

30 parts toluol
5 parts alcohol
10 parts butyl alcohol
20 parts butyl acetate
5 parts dimethyl ether of glycerol
10 parts ethyl acetate
10 parts ester gum
10 parts low viscosity cellulose nitrate

Example 7

36 parts toluol
5 parts alcohol
10 parts butyl acetate
10 parts ethyl acetate
5 parts dimethyl ether of glycerol

*Example 7*—Continued 4 parts plasticizer
    7 parts ester gum
    8 parts low viscosity cellulose nitrate
    15 parts pigments It is understood that the examples given are merely illustrative as the proportions of the various ingredients may be varied widely, depending upon the properties desired and the use to which the composition is to be put. In general, it has been found that the glycerol ether softener may be varied from about 1 to 25% based on the weight of cellulose ester employed. Any suitable solvents, such as aromatic phosphates (e. g. tricresyl phosphate) in place of the camphor, etc., may be used in making up the desired composition. Additional softeners, fire-proofing agents, pigments, etc. may also be added.

The glycerol ethers which are used in the compositions forming the present invention have the following general structural formula:

in which R represents hydrogen or methyl groups. These compounds are excellent softeners for the cellulose esters, particularly cellulose acetate, whereas it has been found that the ethyl ether of glycerol is not a satisfactory solvent for cellulose acetate. In general the ethers of glycerol are practically non-volatile, colorless, practically odorless and many of them are somewhat hygroscopic. Films, lacquer coatings and plastics made from compositions containing the glycerol ether softeners are highly elastic and retain their elongation. The finished products remain free from brittleness for long periods of time and films containing the glycerol ether softeners are characterized by their increased plasticity as compared with the usual type of film. When used in coating compositions such as lacquers, the softeners decrease the rate of volatilization of the lacquer solvent and thereby aid in preventing "blushing" of the finished coating. The glycerol ether softeners are further characterized by being highly stable.

The cellulose ester compositions containing the glycerol ether softeners are adapted to a great variety of uses such as for lacquers, enamels, sheets or films, pyralin and for other cellulose ester plastics. The use of such compositions results in products having highly desirable properties and being capable of wide application.

Films or sheets may be produced by the use of our compositions in any of the usual methods familiar to those skilled in the art, such as by flowing or casting the compositions on suitable casting surfaces (e. g. glass) and allowing the contained volatile solvents to evaporate.

Other desirable changes in composition, use and methods of preparation may be made without departing from the spirit and scope of the invention.

We claim:

1. A composition of matter comprising a cellulose ester and a methyl ether of glycerol.

2. A composition of matter comprising cellulose acetate and a methyl ether of glycerol.

3. A composition of matter comprising cellulose acetate and mono-methyl ether of glycerol.

4. A flexible clear film formed by flowing or casting and subsequently drying a solution comprising approximately 5 parts of cellulose acetate dissolved in approximately 20 parts of acetone and approximately 1 part of a methyl ether of glycerol.

In testimony whereof we affix our signatures.

GEORGE ROCKER.
EDMUND B. MIDDLETON.